Patented Oct. 5, 1948

2,450,675

UNITED STATES PATENT OFFICE 2,450,675

PRODUCTION OF NITRILES

Milton M. Marisic, Northfield, Ill., and William I. Denton, Woodbury, and Richard B. Bishop, Haddonfield, N. J., assignors to Socony-Vacuum Oil Company, Incorporated, a corporation of New York No Drawing. Application August 29, 1946, Serial No. 693,810

9 Claims. (Cl. 260—465.3)

This invention relates to a process for producing nitriles having at least two carbon atoms per molecule, and is more particularly concerned with a catalytic process for producing nitriles having at least two carbon atoms per molecule, from olefinic hydrocarbons.

Nitriles are organic compounds containing combined nitrogen. Their formula may be represented thus: R—C≡N, in which R is an alkyl or aryl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids, followed by reacting the acids thus obtained with ammonia, in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic-substituted alkyl halides; reacting more complex cyanides, such as potassium cuprous cyanide, with diazonium halides; by reacting isothiocyanates with copper or with zinc dust; and by reacting aryl aldoximes with acyl halides.

We have now found a process for producing nitriles having at least two carbon atoms per molecule, which is simple and inexpensive, and which employs non-toxic reactants.

We have discovered that nitriles containing at least two carbon atoms per molecule, can be prepared by reacting olefinic hydrocarbons with ammonia, at elevated temperatures, in the presence of catalytic material of the type defined hereinafter.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms per molecule. Another object is to afford a catalytic process for the production of nitriles containing at least two carbon atoms per molecule. An important object is to provide a process for producing nitriles containing at least two carbon atoms per molecule which is inexpensive and commercially feasible. A specific object is to provide a process for producing nitriles containing at least two carbon atoms per molecule from olefinic hydrocarbons. Other objects and advantages of the present invention will become apparent to those skilled in the art from the following description.

Broadly stated, our invention provides an inexpensive and commercially feasible process for the production of nitriles containing at least two carbon atoms per molecule, which comprises reacting an olefinic hydrocarbon with ammonia, in the gaseous phase and at elevated temperatures, in the presence of catalytic material obtained by decomposing a heteropoly acid or a salt of a heteropoly acid, containing an element selected from the group consisting of molybdenum, tungsten, and vanadium.

Generally speaking, any olefinic hydrocarbon having at least one olefin group (>C=C<) is suitable as the hydrocarbon reactant in the process of our invention. Ethylene, propylene, butenes, octenes, methyl heptenes, butadienes, pentadienes, ethyl butenes, hexadienes, heptenes, pentenes, etc. may be mentioned by way of non-limiting examples. It will be clear from the discussion of reaction temperatures set forth hereinafter, that many olefinic hydrocarbons are not present per se when in contact with ammonia and a catalyst of the type used herein, for many of them are cracked to related hydrocarbons under such conditions. Nevertheless, all olefinic hydrocarbons containing at least one olefin group and their hydrocarbon decomposition products, which are in the vapor phase under the herein-defined reaction conditions serve the purpose of the present invention. It is to be understood also, that hydrocarbon mixtures containing one or more olefinic hydrocarbons may also be used herein, and that when such mixtures are used the reaction conditions, such as contact time, will be slightly different in view of the dilution effect of the constituents present with the olefinic hydrocarbon or hydrocarbons. Indeed, particularly when diolefinic hydrocarbons are used, it is preferred to use mixtures wherein the diolefinic hydrocarbon is present in amounts of less than 50% by volume, and, preferably, less than about 25% by volume, in order to keep polymerization and decomposition of the diolefinic hydrocarbon to a minimum. Accordingly, olefinic hydrocarbons, mixtures thereof, and hydrocarbon mixtures containing one or more of such olefinic hydrocarbons may be used.

Although any olefinic hydrocarbon having at least one olefin group may be utilized in our process, we especially prefer to use those containing up to about ten carbon atoms, and of these, ethylene, propylene and butadienes are especially preferred.

The proportions of reactants, i. e., olefinic hydrocarbon having at least one olefin group and ammonia, used in our process may be varied over a wide range with little effect on the conversion per pass and ultimate yield. In general, the charge of reactants may contain as little as 2 mol. per cent or as much as 98 mol. per cent of olefinic hydrocarbons. In practice, however, we use charges containing between about 20 mol. per cent and about 90 mol. per cent of olefinic hydrocarbons, and ordinarily, we prefer to use charges containing a molar excess of ammonia over the olefinic hydrocarbon reactant.

As stated hereinbefore, we have found that the catalysts to be used to produce nitriles containing at least two carbon atoms per molecule, by reacting olefinic hydrocarbons having at least one olefin group with ammonia, are those obtained by decomposing thermally heteropoly acids and salts of heteropoly acids, containing an element selected from the group consisting of molybdenum, tungsten, and vanadium.

Heteropoly acids are well known in the literature (Modern Aspects of Inorganic Chemistry, H. J. Eméleus and J. S. Anderson; New York; 1940; chapter V). The heteropoly acids operative in the process of the present invention are those which contain an acid anhydride molecule selected from the group consisting of $MoO_3$, $WO_3$ and $V_2O_5$, and at least one other acid anhydride-type molecule, the latter being regarded as the central group of the acid. These heteropoly acids may also be defined broadly as those acids formed by the union of a radical of molybdic, tungstic or vanadic acids—or two or more of these radicals—with one or more radicals of other fairly strong acids or with amphoteric metal hydroxides. A typical heteropoly acid is phosphomolybdic acid, i. e., $H_3[PO_4(MoO_3)_{12}].xH_2O$, in which $x$ represents the number of molecules of water associated with the crystalline acid and is generally a whole number, five to twenty-nine, wherein the phosphate group ($PO_4$) is the central group. Other representative acids which may be mentioned by way of non-limiting examples, are silicomolybdic acid, i. e., $H_4[SiO_4(MoO_3)_{12}].xH_2O$, and phosphovanadotungstic acid, i. e., $$H_3[PO_4(V_2O_5)_2(WO_3)_8].xH_2O$$

Salts of the heteropoly acids referred to, which also are well known in the art, are likewise suitable for the preparation of the catalysts of the process of the present invention. Typical salts of the heteropoly acids are ammonium silicomolybdate, i. e., $(NH_4)_4[SiO_4(MoO_3)_{12}].xH_2O$, and nickel silicomolybdate, i. e., $$Ni_2[SiO_4(MoO_3)_{12}].xH_2O$$

These are mentioned by way of non-limiting examples.

In the interest of brevity, the heteropoly acids and the salts of heteropoly acids contemplated herein as parent materials or intermediates of the catalysts operative in the present process will be referred to hereinafter and in the claims, individually, as a class, and collectively, as heteropoly compounds. The heteropoly compounds may be prepared by any of the methods disclosed in the literature. Advantageously, the components of a heteropoly compound may be composited, blended, or mixed by any suitable means to form an intimate mixture without preparing the heteropoly compound directly, and yet many of the benefits of catalysts prepared from an intermediate heteropoly compound are obtained.

Accordingly, the catalytic materials of the present invention may be obtained by thermally decomposing a heteropoly compound, i. e., a heteropoly acid or a salt of a heteropoly acid, under the hereinafter defined conditions. In general, the temperatures to be used for effecting the thermal decomposition of the heteropoly compounds depend upon the period of time during which a heteropoly compound is subjected to a given temperature. The object of the thermal treatment of the heteropoly compounds is to dehydrate and to decompose them to produce catalytic oxides and yet avoid unnecessary sintering of the resultant catalytic oxides. Sintering detracts from the catalytic activity of the resultant catalytic oxides by reducing the surface area thereof. Accordingly, to obtain the most active catalysts, the thermal treatment of the heteropoly compounds must be carried out at a temperature and for a period of time sufficient to decompose a heteropoly compound, while maintaining sintering of the resultant catalytic oxides to a minimum. In practice, we have found that treatment of the heteropoly compounds at temperatures varying between about 300° F. and about 950° F., for periods of time varying between about two hours and about ten hours, are most convenient from the standpoint of commercial manufacture of the catalysts to be used in the process of this invention. It must be clearly understood, however, that higher or lower temperatures may be used, provided that at higher temperatures, relatively short periods of time are employed so that sintering of the resultant catalytic oxides is kept at a minimum, and that at lower temperatures, relatively longer periods of time are employed to ensure decomposition of the heteropoly compounds.

While the decomposition products of the heteropoly compounds exhibit an appreciable degree of catalytic effectiveness when used per se, they generally possess additional activity when used in conjunction with the well known catalyst supports, such as activated alumina, bauxite, silica gel, carborundum, pumice, clays and the like. We especially prefer to use activated alumina ($Al_2O_3$) as a catalyst support. Without any intent of limiting the scope of the present invention, it is suspected that the enhanced catalytic activity of the supported catalysts is attributable primarily to their relatively larger surface area.

The concentration of catalytic heteropoly compound in the supported catalysts influences the conversion per pass. In general, the conversion per pass increases with increase in the concentration of heteropoly compound. For example, we have found that a catalyst comprising initially 20 parts by weight of phosphomolybdic acid on 80 parts by weight of activated alumina is more effective than one comprising initially 10 parts by weight of phosphomolybdic acid on 90 parts by weight of activated alumina. It is to be understood, however, that supported catalysts containing larger or smaller amounts of catalytic heteropoly compound may be used in our process.

The catalysts of the present invention possess several advantages. In addition to providing relatively high conversions of olefinic hydrocarbons having at least one olefin group into nitriles containing at least two carbon atoms per molecule, they are readily regenerated without loss thereof. In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, steam, etc.

The lower oxides of the aforesaid heteropoly compounds, obtained by decomposing thermally the latter, are not volatile under conditions generally employed in oxidative catalyst regeneration. Therefore, it will be apparent that these catalysts will have a long useful life. The volatility of the catalysts used herein can be correlated with their color. Thus, phosphomolybdic acid (or ammonium phosphomolybdate) on decomposition yields a product which is dark blue in color and non-volatile; whereas arsenomolybdic acid decomposes to a product which is faint blue in color and which is slightly volatile at elevated temperatures in a current of air. Decomposition of silicomolybdic acid results in a product which is intermediate in color and volatility to those of the catalytic products obtained from phosphomolybdic acid and arsenomolybdic acid.

Illustrative of the catalysts contemplated for use in the process of the present invention are the following:

EXAMPLE I

*Decomposition product of phosphomolybdic acid on activated alumina*

Two hundred (200) c. c. of 36% hydrochloric acid were added to 600 c. c. of a solution containing 400 grams of sodium molybdate, $Na_2MoO_4.2H_2O$, with constant stirring. The resulting solution was maintained at a temperature of 170° F. and 400 c. c. of a solution containing 98.6 grams of sodium monohydrogen phosphate, $Na_2HPO_4.12H_2O$, were added thereto, followed by 422 c. c. of 38% hydrochloric acid, the latter being added dropwise while the solution was constantly stirred. The yellow colored solution thus formed was cooled to room temperature (about 70-75° F.) and extracted with diethyl ether. The etherphosphomolybdic acid complex so formed was then diluted with distilled water and poured onto 500 c. c. of activated alumina (8-14 mesh granules). Ether and water were removed by evaporation and the impregnated alumina thus formed was gradually heated to a temperature of 840° F. and maintained at that temperature for two hours. The catalytic material thus obtained was dark blue in color and comprised oxides of molybdenum and phosphorus on alumina.

EXAMPLE II

*Decomposition product of ammonium phosphovanadotungstate on activated alumina*

Two hundred (200) grams of ammonium tungstate, $(NH_4)_2WO_4$, 43.4 grams of ammonium metavanadate, $NH_4VO_3$, 8.6 grams of ammonium monohydrogen phosphate, $(NH_4)_2HPO_4$, and 140 c. c. of 36% aqueous ammonia were added to 3 liters of distilled water. The mixture was stirred and heated to a temperature of about 200° F. until solution of the salts was complete. The volume was kept constant by occasionally adding distilled water. A deep red solution was obtained. The solution was evaporated to about 500 c. c. and then was poured onto 500 c. c. of activated alumina (8-14 mesh granules). Water was removed by evaporation and the impregnated alumina thus obtained was gradually heated to a temperature of 840° F. and maintained at that temperature for two hours. The catalytic material thus formed was reddish brown in color and comprised oxides of vanadium, tungsten and phosphorus on alumina. It may be considered as derived from phosphovanadotungstic acid.

EXAMPLE III

*Decomposition product of silicomolybdic acid on activated alumina*

This catalytic material was prepared in the same manner as the catalyst of Example I, with the exception that the sodium monohydrogen phosphate was replaced by sodium silicate. The catalyst thus obtained was pale blue in color and comprised the oxides of molybdenum and silica on alumina.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, and more particularly, contact times varying between 0.3 second and 30 seconds.

In general, the temperatures to be used in our process vary between about 800° F. and up to the decomposition temperature of ammonia (about 1250-1300° F.), and preferably, between about 850° F. and about 1075° F. The preferred temperature to be used in any particular operation will depend upon the nature of the olefinic hydrocarbon reactant employed. Generally speaking, the higher temperatures increase the conversion per pass, but they also increase the decomposition of the reactants, thereby decreasing the ultimate yields of nitriles. Accordingly, the criteria for determining the optimum temperature to be used in any particular operation will be based on the nature of the olefinic hydrocarbon reactant and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that the unreacted charge materials can be condensed more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into the olefinic hydrocarbon molecule, thereby avoiding intermediate steps with their accompanying increased cost. In our process, we have noted that considerable amounts of hydrogen are evolved; that when olefinic hydrocarbons higher than ethylene are employed, aliphatic nitriles having fewer carbon atoms per molecule than the olefinic hydrocarbon reactant predominate in the reaction product; and that when olefinic hydrocarbons containing at least six carbon atoms per molecule are employed, aliphatic nitriles, as well as aromatic nitriles are obtained. Hence, it is postulated, without any intent of limiting the scope of the present invention, that in our process, the aliphatic nitriles are formed in accordance with the following equations, using propylene as an example:

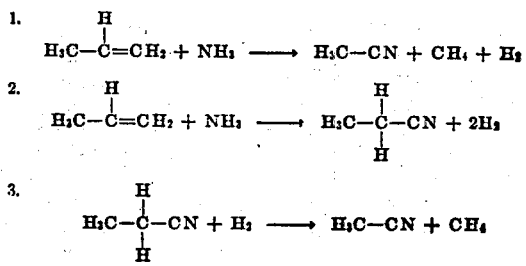

and that when olefinic hydrocarbons containing at least six carbon atoms per molecule are employed, the aliphatic nitriles are formed in accordance with the foregoing equations, while the aromatic nitriles are formed through cyclization of the olefinic hydrocarbon reactant followed by the introduction of nitrogen therein.

The present process may be carried out by making use of any of the well-known techniques for operating catalytic reactions in the vapor phase effectively. By way of illustration, propylene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration and purging, etc. The reaction mixture will be predominantly a mixture of aliphatic nitriles, hydrogen, unchanged propylene, and unchanged ammonia. The aliphatic nitriles, the unchanged propylene and unreacted ammonia will be condensed in passing through the condensing zone and will be retained in the receiving chamber. The aliphatic nitriles can be separated from the unchanged propylene and ammonia by any of the numerous and well known separation procedures, such as pressure stabilization or distillation. If desired, the unchanged propylene and unchanged ammonia can be separated from each other, or, the unchanged propylene and ammonia can be recycled, with or without fresh propylene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, or by isolating finely divided catalyst in powder form by means of cyclone separators, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific olefinic hydrocarbon reactant or to the specific catalysts disclosed therein or to the manipulations and conditions set forth in the examples. As it will be apparent to those skilled in the art, a wide variety of other olefinic hydrocarbons and of other catalysts of the type described hereinbefore may be used.

A reactor consisting of a shell containing a catalyst chamber was heated by circulating a heat-transfer medium outside the shell. Ammonia and the olefinic hydrocarbon reactant were introduced in the vapor phase into the reactor. The reaction mixture was passed from the reactor, through a condenser, into a first receiving chamber. Hydrogen, unchanged ammonia, and unchanged olefinic hydrocarbon reactant were collected in a second receiving chamber and then separated from each other. The nitriles remained in the first receiving chamber and were subsequently separated by distillation. The pertinent data of each run are shown in the following table:

a heteropoly compound containing the acid anhydride molecule $MoO_3$ at a temperature falling within the range varying between about 300° F. and about 950° F. and for a period of time falling within the range varying between about two hours and ten hours, supported on alumina.

| Example No. | 4 | 5 | 6 | 7 |
|---|---|---|---|---|
| Olefinic Hydrocarbon Reactant | Octene | Propylene | Propylene | Propylene |
| Moles of Hydrocarbon per hour | 1.5 | 7.5 | 7.5 | 7.5 |
| Moles of Ammonia per hour | 3.0 | 15.0 | 15.0 | 15.0 |
| Molar Ratio, $NH_3$: olefinic hydrocarbon reactant | 2:1 | 2:1 | 2:1 | 2:1 |
| Temperature, °F | 1,055 | 900 | 1,000 | 850 |
| Contact time, Seconds | 4.0 | 1.2 | 1.2 | 1.2 |
| Catalyst | Example 1 | Example 1 | Example 2 | Example 3 |
| Nitriles formed | Benzo-nitrile | Aceto-nitrile | Aceto-nitrile | Aceto-nitrile |
| Conversion per pass: Weight per cent based on hydrocarbon charged | 1.0 | 13.3 | 5.4 | 9.4 |

It will be apparent that the present invention provides an efficient, inexpensive and safe process for obtaining nitriles. Our process is of considerable value in making available relatively inexpensive nitriles which are useful, for example, as intermediates in organic synthesis.

This application is a continuation-in-part of copending application, Serial Number 539,034, filed June 6, 1944, now abandoned.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

We claim:

1. A process for the production of nitriles having at least two carbon atoms per molecule, which comprises contacting an olefinic hydrocarbon containing up to about ten carbon atoms per molecule, with ammonia, in gaseous phase, at temperatures falling within the range varying between about 850° F. and about 1075° F., in the presence of catalytic oxides obtained by treating a heteropoly compound containing an acid anhydride molecule selected from the group consisting of $MoO_3$, $WO_3$, and $V_2O_5$, at a temperature and for a period of time sufficient to decompose said heteropoly compound.

2. A process for the production of nitriles having at least two carbon atoms per molecule, which comprises contacting an olefinic hydrocarbon containing up to about ten carbon atoms per molecule, with ammonia, in gaseous phase, at temperatures falling within the range varying between about 850° F. and about 1075° F., in the presence of catalytic oxides obtained by treating a heteropoly compound containing an acid anhydride molecule selected from the group consisting of $MoO_3$, $WO_3$, and $V_2O_5$, at a temperature falling within the range varying between about 300° F. and about 950° F. and for a period of time falling within the range varying between about two hours and ten hours, supported on a catalyst support.

3. A process for the production of nitriles having at least two carbon atoms per molecule, which comprises contacting an olefinic hydrocarbon containing up to about ten carbon atoms per molecule, with ammonia, in gaseous phase, at temperatures falling within the range varying between about 850° F. and about 1075° F., in the presence of catalytic oxides obtained by treating a heteropoly compound containing the acid anhydride molecule $MoO_3$ at a temperature falling within the range varying between about 300° F. and about 950° F. and for a period of time falling within the range varying between about two hours and ten hours, supported on alumina.

4. A process for the production of nitriles having at least two carbon atoms per molecule, which comprises contacting propylene with ammonia, in gaseous phase, at temperatures falling within the range varying between about 850° F. and about 1075° F., in the presence of catalytic oxides obtained by treating a heteropoly compound containing the acid anhydride molecule $MoO_3$, at a temperature and for a period of time sufficient to decompose said heteropoly compound.

5. A process for the production of nitriles having at least two carbon atoms per molecule, which comprises contacting propylene with ammonia, in gaseous phase, at temperatures falling within the range varying between about 850° F. and about 1075° F., in the presence of catalytic oxides obtained by treating a heteropoly compound containing the acid anhydride molecule $MoO_3$ at a temperature falling within the range varying between about 300° F. and about 950° F. and for a period of time falling within the range varying between about two hours and ten hours, supported on a catalyst support.

6. A process for the production of nitriles having at least two carbon atoms per molecule, which comprises contacting propylene with ammonia, in gaseous phase, at temperatures falling within the range varying between about 850° F. and about 1075° F., in the presence of catalytic oxides obtained by treating a heteropoly compound containing the acid anhydride molecule $MoO_3$, at a temperature falling within the range varying between about 300° F. and about 950° F. and for a period of time falling within the range varying between about two hours and ten hours, supported on alumina.

7. A process for the production of nitriles having at least two carbon atoms per molecule, which comprises contacting octene with ammonia, in gaseous phase, at temperatures falling within the range varying between about 850° F. and about 1075° F., in the presence of catalytic oxides obtained by treating a heteropoly compound containing the acid anhydride molecule $MoO_3$, at a temperature and for a period of time sufficient to decompose said heteropoly compound.

8. A process for the production of nitriles having at least two carbon atoms per molecule, which comprises contacting octene with ammonia, in gaseous phase, at temperatures falling within the range varying between about 850° F. and about 1075° F., in the presence of catalytic oxides obtained by treating a heteropoly compound containing the acid anhydride molecule $MoO_3$, at a temperature falling within the range varying between about 300° F. and about 950° F. and for a period of time falling within the range varying between about two hours and ten hours, supported on a catalyst support.

9. A process for the production of nitriles having at least two carbon atoms per molecule, which comprises contacting octene with ammonia, in gaseous phase, at temperatures falling within the range varying between about 850° F. and about 1075° F., in the presence of catalytic oxides obtained by treating a heteropoly compound containing the acid anhydride molecule $MoO_3$, at a temperature falling within the range varying between about 300° F. and about 950° F. and for a period of time falling within the range varying between about two hours and ten hours, supported on alumina.

MILTON M. MARISIC.
WILLIAM I. DENTON.
RICHARD B. BISHOP.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,934,838 | Andrussow | Nov. 14, 1933 |
| 2,325,033 | Byms | July 27, 1943 |
| 2,331,968 | Forney | Oct. 19, 1943 |
| 2,381,709 | Apgar et al. | Aug. 7, 1945 |
| 2,418,562 | Teter | Apr. 8, 1947 |
| 2,432,532 | Mahan | Dec. 16, 1947 |

OTHER REFERENCES

Berkman et al., "Catalysis" (Reinhold, 1940) page 873.